(No Model.)
T. E. CARTER.
CULTIVATOR AND HARROW.
No. 397,632. Patented Feb. 12, 1889.
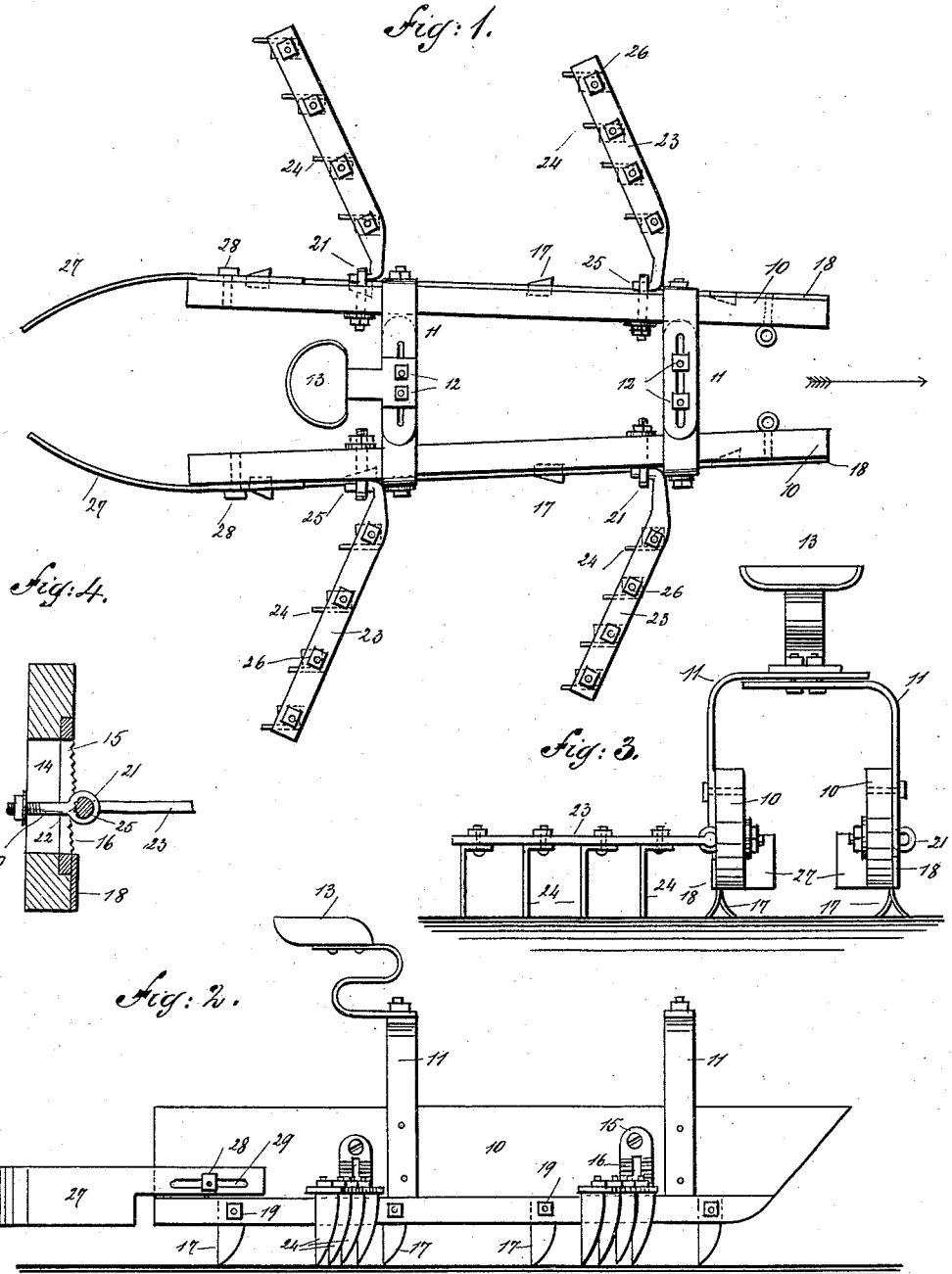

UNITED STATES PATENT OFFICE.

THOMAS E. CARTER, OF AUGUSTA, KANSAS.

CULTIVATOR AND HARROW.

SPECIFICATION forming part of Letters Patent No. 397,632, dated February 12, 1889.

Application filed October 31, 1888. Serial No. 289,685. (No model.)

*To all whom it may concern:*

Be it known that I, THOMAS E. CARTER, of Augusta, in the county of Butler and State of Kansas, have invented a new and Improved Combined Cultivator and Harrow, of which the following is a full, clear, and exact description.

My invention relates to an improvement in a combined cultivator and harrow, and has for its object to provide an implement of simple and durable construction, wherein the cultivator-teeth are so fixed as to effectually cultivate the ground adjacent to the corn.

A further object of the invention is to provide a means whereby a series of harrows may be projected from the body of the cultivator proper, which harrows are adjustable; and the further object of the invention is to provide at the rear of the frame scrapers adapted to convey the loose dirt in to the roots of the corn.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement. Fig. 2 is a side elevation. Fig. 3 is a front elevation of the same, the arms carrying the harrow-teeth being removed from one side; and Fig. 4 is a transverse section through one of the frames, illustrating the mode of attaching the arms carrying the harrow-teeth to the same.

In carrying out the invention, the frame of the implement consists of two side pieces, 10, connected by suitable yokes, 11, in such manner as to be closer at one end than at the other, which yokes are attached, preferably, to the outer face of the side pieces, extending over the top of the same, as best illustrated in Figs. 1 and 3. The yokes 11 are constructed in two sections, the upper ends whereof, which curve over the sides, are overlapped and longitudinally slotted to receive suitable bolts, 12, which bolts are provided with lock-nuts. By reason of the sectional yokes, the sides may be adjusted outward from one another or made to project any desired distance to suit the width of the rows of the plant to be cultivated.

Upon the rear yoke or arch 11 the driver's seat 13 is located, being secured thereto by the same bolts or nuts uniting the sections of the said yoke or arch.

Between the ends of the side pieces, 10, two or more spaced vertical slots, 14, are produced, extending preferably from a point near the bottom to a point near the top. The surface surrounding the outer sides of the slots is preferably countersunk to receive the slotted plate 15, provided upon the outer face with a series of teeth, 16, as best illustrated in Figs. 2 and 4, the slots in the plate being of the same size and registering with the slots 14 in the frame of the cultivator.

In the under side of the side pieces, 10, of the frame a series of cultivator-teeth, 17, are secured, represented as alternately curving outward in opposite directions; but I desire it to be distinctly understood that I do not confine myself to this disposition of cultivator-teeth, as if it is found desirable in practice the said teeth may be straight or made to incline in one direction.

The teeth 17 are usually made to fit in a recess produced in the outer face of the several side pieces at the bottom, being held rigidly in position through the medium of a metal strip or strips, 18, extending longitudinally the outer face of the said side pieces, 10, and a bolt or bolts, 19, are passed through the said strip and the upper end of the said teeth, as best illustrated in Fig. 2. The strips 18 perform a dual function, serving, in the first place, to retain the teeth in proper position, and, secondly, as guards whereby the side pieces are prevented from wearing by contact with the earth. Through each slot 14 a threaded bolt, 20, is projected, threaded upon the inner end and provided with a nut of sufficient length to engage the opposite sides of the slot, and having formed integral with the outer extremity an eye, 21.

The eye 21 of each bolt 20 is adapted to receive an arm, 23, preferably of metal, to which arms a series of harrow-teeth, 24, are secured. A hook, 25, is formed at one end of the arms 23, provided with a series of teeth or serrations, 22, the said hook extending out from one longitudinal edge of the said arms at less than right angles, whereby when the hook 25 is passed through the eye 21 of the bolt 20 the arms will have an inclination in direction of the rear of the side pieces, 10, of the frame.

The teeth 24 are secured to the under side of the arms 23 through the medium of suitable bolts, 26, extending upward through the upper surface of the teeth and also through the arms, the said bolts being provided upon the upper end with any approved form of nut or equivalent retaining device. The teeth 24 are usually made with one straight cutting-edge and an opposite curved cutting-edge, as best shown in Fig. 2, and by means of the bolts 26 the teeth may be made to face in direction of the rear or forward end of the frame, as may be found most desirable. It will also be observed that by reason of the toothed plate 15 and the teeth upon the hooks 25 the arms carrying said hooks, when raised or lowered, are held in a proper position by engagement of the roughened surface of the hooks with the toothed plate 15, the two being clamped together by the bolt 20 and the nut located upon the inner side of the same, as best shown in Fig. 4. The bars 23 and teeth 24 may be adjusted and held at any desired inclination to the frame 10.

To the outer face of each side piece, 10, at the rear, scrapers 27 are adjustably attached. The said scrapers are made to extend beyond the side pieces and curve inward, or in direction of one another, a space being made to intervene the extremities of the said scrapers sufficient to permit the ready passage of the corn or other plant to be cultivated.

The scrapers are attached to the side pieces through the medium of a bolt or bolts, 28, passing through the side pieces and also through a longitudinal slot, 29, formed in the inner end of the said scrapers, the bolt being held in position by a suitable nut. Thus the scrapers may be adjusted laterally or vertically, as occasion may demand.

In operation, as the device is carried forward the corn passing between the contiguous faces of the side pieces and below the yokes or arches is cultivated at or near the roots by the teeth 17, and the teeth 24, attached to the arms 23, break and loosen the dirt between the rows, while the scrapers 27 at the end of the implement carry the loose and pulverized earth in to the corn, piling the same up around the roots, and the side bars effectually prevent clods from falling in upon the corn.

This cultivator, though specially adapted for use in cultivating listed corn, is equally well adapted for use on level ground.

Having thus fully described my invention, I claim as new and desire to secure by Letters Patent—

1. The combination, in a cultivator, with the side bars having vertically-slotted toothed plates, of transverse eyebolts projecting therethrough, and vertically-swinging teeth carrying arms having their inner ends provided with hooks or bends entering the eyes of said bolts, the hooks or bends having teeth or projections interlocking with said toothed plates, substantially as set forth.

2. The combination, with the side bars of the cultivator, of the plates 18, extending longitudinally along the lower outer edges of said side bars, the teeth projecting up between plates and bars, and the bolts passing through the teeth and bars and securing both in place, substantially as set forth.

3. In a combined cultivator and harrow, the combination, with the side pieces, adjustable and sectional yokes or arches connecting the same, cultivator-teeth attached to the under face of the side pieces, and adjustable scrapers attached to the rear end of the said side pieces curving inward, of adjustable arms attached to the outer face of the said side pieces extending rearward at an inclination therefrom, and adjustable harrow-teeth attached to the said arms, substantially as and for the purpose specified.

4. In a combined cultivator and harrow, the combination, with side pieces provided with a series of vertical spaced slots, laterally adjustable and sectional yokes or arches connecting the same, teeth attached to the under face of the side pieces, scrapers adjustably secured to the rear ends of the said side pieces curving inward, and a toothed or notched plate surrounding the outer edge of the slots in the side pieces, of a bolt projected through the said slot provided with an eye at the outer end, arms supported by the said bolt, having an inclination to the rear and provided with a hooked extremity having a roughened surface, and harrow-teeth adjustably attached to the said arms, substantially as shown and described.

5. In a combined cultivator and harrow, the combination, with the side pieces of a cultivator provided with a series of vertical spaced slots and toothed plates surrounding the outer edges of the said slots, of a bolt projected through the slots beyond the plate, arms supported by the said bolt and held at their inner ends against the toothed plates, and teeth adjustably secured to the under side of the said arms, all combined to operate substantially as shown and described.

THOMAS E. CARTER.

Witnesses:
F. C. RULAND,
B. M. VAN DERVOORT.